US009875192B1

(12) United States Patent
Allen

(10) Patent No.: US 9,875,192 B1
(45) Date of Patent: Jan. 23, 2018

(54) FILE SYSTEM SERVICE FOR VIRTUALIZED GRAPHICS PROCESSING UNITS

(71) Applicant: Amazon Technologies, Inc., Seattle, WA (US)

(72) Inventor: Nicholas Alexander Allen, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 397 days.

(21) Appl. No.: 14/750,973

(22) Filed: Jun. 25, 2015

(51) Int. Cl.

| | |
|---|---|
| ***G06F 12/12*** | (2016.01) |
| ***G06F 12/122*** | (2016.01) |
| ***G06F 9/455*** | (2006.01) |
| ***G06F 9/50*** | (2006.01) |
| ***G06F 9/30*** | (2006.01) |
| ***G06F 17/30*** | (2006.01) |
| ***G06F 12/0871*** | (2016.01) |

(52) U.S. Cl.
CPC .......... *G06F 12/122* (2013.01); *G06F 9/3009* (2013.01); *G06F 9/45558* (2013.01); *G06F 9/5016* (2013.01); *G06F 12/0871* (2013.01); *G06F 17/30088* (2013.01); *G06F 2009/45583* (2013.01); *G06F 2212/604* (2013.01); *G06F 2212/69* (2013.01)

(58) Field of Classification Search
CPC .. G06F 12/122; G06F 12/0871; G06F 9/3009; G06F 9/5016; G06F 9/45558; G06F 17/30088; G06F 2212/604; G06F 2212/69; G06F 2009/45583
See application file for complete search history.

(56) References Cited

U.S. PATENT DOCUMENTS

| | | | | |
|---|---|---|---|---|
| 7,353,360 B1 * | 4/2008 | Muller | G06F 12/10 | 709/223 |
| 8,938,571 B1 * | 1/2015 | Vincent | G06F 12/023 | 370/429 |
| 2011/0264867 A1 * | 10/2011 | Wan | G06F 9/30087 | 711/147 |
| 2012/0229481 A1 * | 9/2012 | McCrary | G06F 9/5044 | 345/522 |
| 2014/0115246 A1 * | 4/2014 | Maybee | G06F 12/0868 | 711/105 |

* cited by examiner

*Primary Examiner* — Maurice L McDowell, Jr.
(74) *Attorney, Agent, or Firm* — David Wright Tremaine LLP

(57) ABSTRACT

A system and method that includes receiving a call, from a thread, of a plurality of threads performing the same operations in parallel, in association with a virtual machine, to read a block of data from a file, allocating memory accessible by both the virtual machine and the plurality of threads for receiving the block, and providing the block by causing the block to be copied from the file associated with a file descriptor into the memory. A system and method that includes receiving a call from a thread of a plurality of threads executing the same instructions in parallel in association with a virtual machine, to write a block of data to a file, configuring a buffer accessible by the virtual machine to receive the block, writing the block to the configured buffer, and causing the block to be copied from the configured buffer to the file.

20 Claims, 9 Drawing Sheets

300
GPU 302
File Buffer 304
LRU Cache 316
Ring Buffer 320
Message Queue 318
Index of Active File Descriptors 308
Virtual Machine Instance 314
CPU 306
IOMMU 312

FILE SYSTEM SERVICE FOR VIRTUALIZED GRAPHICS PROCESSING UNITS

BACKGROUND

Programs for graphics processing units are typically characterized by running many threads with few or no flow-control variations between the threads of execution. In contrast to a traditional central processing unit that typically has a handful of execution cores that operate independently, a graphics processing unit might have several thousands of cores that must largely run in concert. Because of these differences, traditional services, such as file systems, may be unavailable to software applications that utilize graphics processing units, which can result in excessively complex executable code and inefficient use of software development resources.

BRIEF DESCRIPTION OF THE DRAWINGS

Various embodiments in accordance with the present disclosure will be described with reference to the drawings, in which.

DETAILED DESCRIPTION

Figure 1:
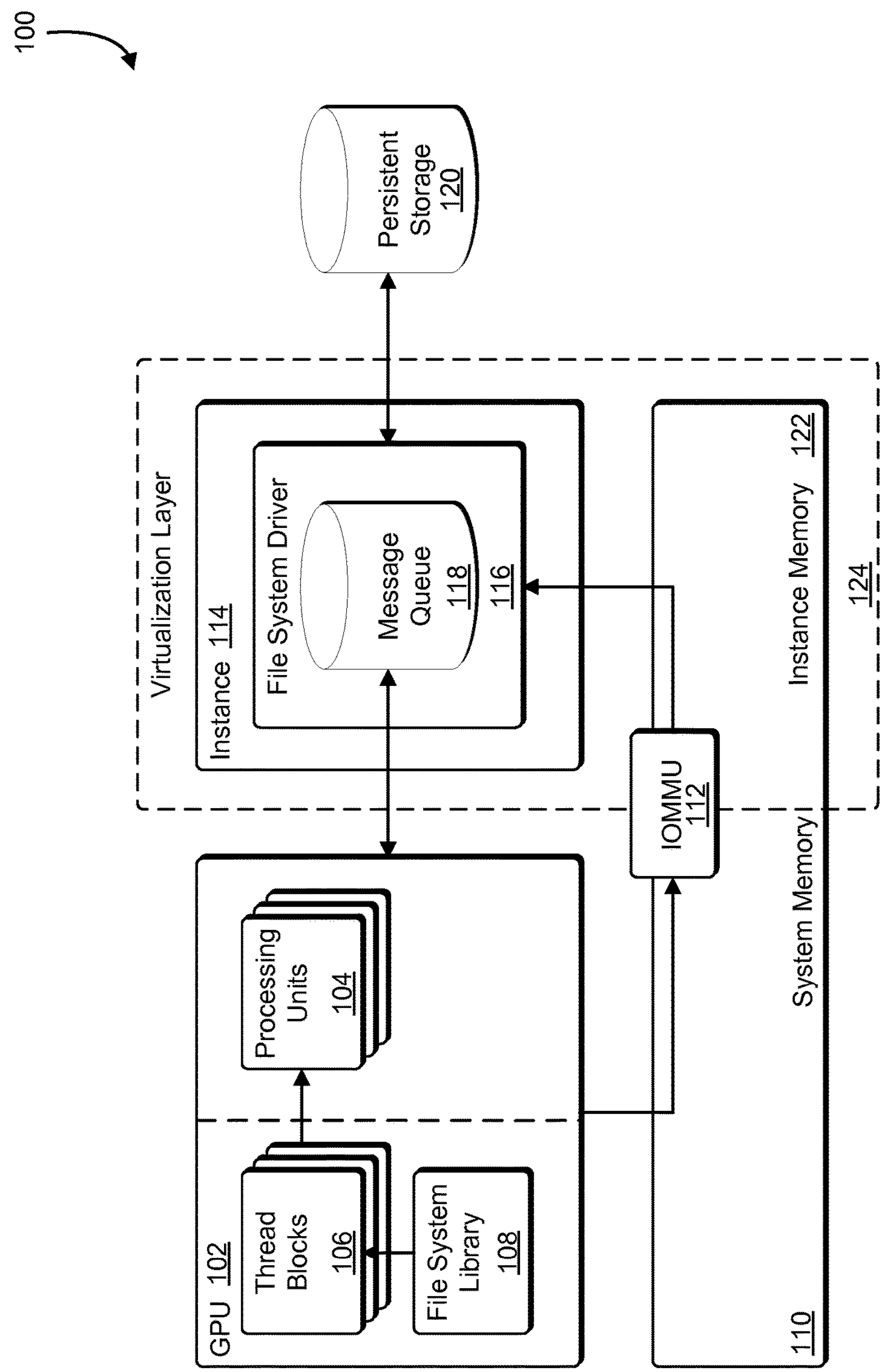
FIG. 1 illustrates an example of a system for providing a file system to a graphics processing unit application in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for enabling a graphics processing unit to read and write data from a file system in a virtual computing environment. The techniques include providing functionality to threads executing in a highly parallel computing environment, through a set of library code compiled into the thread instructions or through a component external to the threads, functionality providing access to files in a file system. The functionality may include an "open" call for causing a buffer for storing data to be initialized and indicating that a particular thread has been allowed to access the file specified by the open call. The functionality may further include a "read" call for reading data from the opened file into a buffer accessible by the thread, a "write" call for writing processed data to the buffer for output to a thread, and a "close" call for indicating that the file is no longer in use.

The techniques are directed to providing a graphics processing unit access to an input file of file system accessible to a virtual machine hosted by a host computing system. The host computing system may be one of a plurality of computing systems in a distributed computing environment of a computing resource service provider. The virtual machine may be a virtual machine that is provided to a customer of the computing resource service provider through a virtual computing system service, and the virtual machine may be configured to launch an and run application that executes a plurality of threads in parallel in a highly parallel processor, such as a graphics processing unit. The techniques include receiving an open call from a thread of a block of threads being executed by the graphics processing unit to open the file specified by the open call. In response to receiving the open call, if a file buffer has not already been initialized, the system may initialize a file buffer such that the file buffer is accessible by the block of threads and the virtual machine. The file buffer may be rendered accessible to both the threads and the virtual machine by using an input/output memory management unit for mapping addresses in system memory to addresses in virtual memory of the virtual machine. In further response to receiving the open call, a file descriptor, such as a distinct integer, may be assigned/allocated to the file, and subsequent open calls from the threads specifying the same file may cause a concurrent use counter to be incremented. The file descriptor may be added to an index of active file descriptors, which may indicate that the file is being used by at least one thread. The current value of the concurrent use counter may be provided to the requesting thread as an identifier (which may be used in calculating a local offset when reading from the file), and the current value of the concurrent use counter may also be used to determine how many threads are concurrently accessing the file.

The techniques further include receiving a read call from a thread of a block of threads to read a block of data from the previously opened file. In response to receiving the read call, the system may first determine whether the block of data already resides in least recently used cache of the file buffer. If the block of data resides in the cache, the thread may obtain the block of data directly from the cache. Otherwise, the system may compute an input file offset, which may be based on a global file offset for the block of threads and a local file offset for the requesting thread, and copy that block of data, starting at the location corresponding to the input file offset, into a read page allocated to the least recently used cache of the file buffer, whereupon the block of data may be obtained by the thread from the read page allocated to the cache.

The techniques further include receiving a write call from a thread of a block of threads executing in a highly parallel processor, such as a graphics processing unit, in response to an application running on a virtual machine to write a block of processed data to the file system of the virtual machine. In response to receiving the write call, and output file offset may be computed, which again may be based on a global file offset associated with the block of threads and a local file offset associated with the requesting thread. A write page may be allocated to a ring buffer in the file buffer, and the block of processed data may be written to the write page. In order to minimize the frequency of data output to the file system, the system may accumulate a plurality of blocks of processed data before flushing the ring buffer to the file system. Upon a determination by the system that the blocks of processed data should be committed to an output file in the file system, a central processing unit may be triggered, such as by placing a message in a message queue directed to the central processing unit, to copy the data from the ring buffer to the file system.

The techniques further include receiving a close call from a thread of a block of threads to close the specified file. In response to receiving the close call, the concurrent use counter may be decremented, and when it is determined that no more threads are accessing the specified file (e.g., the concurrent use counter has been decremented to zero), the file descriptor for the specified file may be removed from the index of active file descriptors.

Described and suggested techniques improve the field of computing, specifically the field of parallel processing, by enabling large data sets stored in persistent storage to be processed using highly parallel processors. Additionally, described and suggested techniques improve the efficiency of highly parallel processors in computing large data sets by allowing threads of a block of threads executing in the processors to access files of the file system in parallel and in lockstep with other threads in the block of threads. Moreover, described and suggested techniques are necessarily rooted in computer technology in order to overcome a problem specifically arising with the ability of graphics processing units to read from and write to file systems.

FIG. 1 illustrates an aspect of an environment 100 in which an embodiment may be practiced. As illustrated in FIG. 1, the environment 100 may include a graphics processing unit 102 having two or more internal processing units 104 (also referred to as "cores," "processing cores," or "execution cores"). Each of the processing units 104 may perform work for a thread in the thread blocks 106. A graphics processing unit, such as the graphics processing unit 102, may be beneficial for performing highly parallel tasks; that is, where a large number (e.g., thousands) of tasks may be processed in parallel in a similar fashion. As an example, a customer of a computing resource service provider having access to a virtual machine may desire to process a large data set that has been stored at a location accessible to the virtual machine, such as in a block-level data store attached to the virtual machine. Because the memory available to the virtual graphics processing unit may be limited, storing the entire data set in graphics processing memory may not be possible. However, the system of the present disclosure can expose the file system to the graphics processing unit in order to allow the graphics processing unit to access the data set from the file system without requiring that the entire data set be loaded into graphics processing memory. In other words, in cases where there is more data than is needed for any particular computation, the system of the present disclosure can provide access to the data at the location where it is stored and allow the program performing the computation to selectively read only the portions of the data that are actually needed for the computation.

As noted, a central processing unit may only have a handful of cores (e.g., 4 to 16), and each core may be able to handle one or two threads in parallel. Consequently, a central processing unit having four cores may only be able to process a maximum of eight threads in parallel. In contrast, a graphics processing unit may be able to process 8,000 threads in parallel. However, the processing capabilities of each core of the graphics processing unit may be limited.

The cores of the graphics processing unit may be divided into blocks. For example, a block of graphics processing unit cores may include several hundred cores (e.g., 256, 512, etc.). Alternatively, all of the graphics processing unit cores of a graphics processing unit may be operating as a single block. However, in both examples, all of the cores in a block must be performing operations in lockstep with the other cores in the block. Thus, in order for a graphics processing unit to access the file system so that each core is acting in lockstep with each other, the system of the present disclosure abstracts the files in the file system as a batch of parallel records that are offset from each other by an offset value. In this manner, each of the cores may be executing the same instructions, but on different data located at different offset values.

Virtual computing resources may be provided to customers of a computing resource service provider through a virtual computer system service. The system of the present disclosure contemplates providing virtual graphics processing units so that customers can cause highly parallel tasks (i.e., operations) to be performed by a virtual machine. The system of the present disclosure provides additional functionality with its graphical processing units by enabling file accesses by the virtual graphics processing units.

The graphics processing unit 102, in the context of the present disclosure, may be a processor configured to perform highly parallel operations. To that end, a graphics processing unit may contain thousands of compute cores that may all be processing identical executable code simultaneously in lockstep, unlike typical central processing units, which may contain a handful of more complex compute cores, which could be processing different executable code independently of each other. Graphics processing units may be utilized to perform specialized image processing tasks, such as texture mapping, rendering polygons, and ray tracing extremely quickly (e.g., rendering 10 million polygons per second). However, graphics processing units may also be useful for other highly parallel processing tasks, such as cipher block chaining large data sets. Examples of graphics processing units include the Nvidia Tesla, ATI/AMD Radeon, and S3 Graphics graphics processing units. Although the present disclosure uses the term graphics processing unit, any highly parallel coprocessor, of which a graphics processing unit is one, may be used in place of the graphic processors described.

The graphics processing unit 102 may be a multi-core processor, and consequently the processing units 104 may be a plurality of cores configured to perform independent processing tasks in parallel and lockstep with each other, thereby executing multiple occurrences of the same instruction at the same time. The thread blocks 106 may be sets of executing instructions, being executed by the processing units 104. The file system library 108 may be a collection of computing resources, such as functions, subroutines, classes, and values that, when compiled into a format executable by a processor, comprise at least part of the file system service of the present disclosure. The functionality of the instructions within the file system library may be provided to the thread of the thread blocks 106 by joining the file system library instructions with the executable instructions being executed in the thread blocks at compile time. Note that it is contemplated in the present disclosure that, in some embodiments, at least some of the functionality of the instructions within the file system library are implemented in software or hardware residing outside of the thread blocks 106, such as in a hypervisor or in hardware of the host computing system.

The file system described in the embodiments in the present disclosure is a file system configured to access files stored on a physical storage device coupled with a computing system. The system memory 110 may represent physical memory of the host computing system, which may include random access memory, read only memory, and page file memory mapped to persistent storage. The input/output memory management unit 112 may be a memory management unit that maps addresses in the system memory 110 to addresses in the instance memory 122.

In some embodiments of the system of the present disclosure, rather than an input/output memory management unit, the graphics processing unit uses the system memory for its addresses, and then a virtualization manager, such as a hypervisor, a controlling domain, or other administrative process, may act to enable a virtual machine to access the information from the graphics processing unit. This may involve a copy operation that copies from system memory into memory pages that are acceptable by the virtual machine, or may involve a call to a hypervisor to perform a translation mapping operation in order to map certain pages in the system memory 110 to portions of the instance memory 122 of the instance 114. When the instance 114 is finished reading the information from memory, the hypervisor may then disassociate that system memory address from the instance memory 122, thereby making it available for other purposes. However the input/output memory management unit 112 may provide the advantage of direct address translation from the system memory 110 to instance memory 122; in other words, the input/output memory management unit 112 effectively allows the graphics processing unit 102 to directly communicate with the instance 114, bypassing the virtualization layer 124.

The instance 114 may be a virtual machine executing in the software and/or hardware of the host computing system and emulating a computing system such that software executing in the virtual machine behaves as if the virtual machine were a physical computing system. In the environment 100, the instance 114 may be executing an application configured to cause the graphics processing unit 102 to process data sets from a file of a file system and output the process data sets to the file system. The instance 114 may be one of the plurality of virtual machines provided to customers of a computing resource service provider through a virtual computing system service.

The file system driver 116 may be an application executing within the software instance 114 that allows the instance 114 to read and write from the file buffer of the present disclosure. Further description regarding the file buffer may be found in the description of the file buffer 304 of FIG. 3. The file system driver 116 may include the message queue 118, which allows messages to be passed between the graphics processing unit and or/file buffer and the central processing unit of the host computing system. The message queue 118 may operate as an out-of-band channel for the exchange of messages between the instance 114 and an external entity, such as a central processing unit of the host computing system. The persistent storage 120 may be local storage of the host computing system, or, in some implementations, may be network attached storage, such as a block level store of a block level storage service provided by a computing resource service provider.

The instance memory 122 may be virtual memory of the instance 114 with the virtual memory addresses that are mapped to real/physical memory addresses and/or physical storage of the host computing system. In this manner, the virtual memory addresses may appear to be contiguous address space even if the physical memory addresses assigned to the virtual memory addresses are not contiguous and even if the virtual memory is mapped to both physical memory and physical storage. By mapping virtual memory to physical storage, the virtual memory can be configured to be larger than the real/physical memory of the host computing system. When data is written to a virtual memory address, a memory management unit may automatically translate the virtual address to its corresponding physical address.

The virtualization layer 124 may be a component of the host computing system that used to provide computational resources upon which one or more virtual machines may operate. In a hosted computing environment of a computing resource service provider, the virtual machines may be provided to customers of a computing resource service provider, and the customers may run operating systems, applications and/or other such computer system entities on the virtual machine. The virtualization layer 124 may be any device, software or firmware used for providing a virtual computer platform for the virtual machines, and may enable virtual machines to access the physical hardware of a host computing system. An example of the virtualization layer 124 is a hypervisor. The virtual computer platform may include various virtual computer components, such as one or more virtual processors, virtual memory, and other virtual devices.

In the environment 100, a customer of a computing resource service provider may cause the instance 114 to be instantiated and begin running an application for using the graphics processing unit 102 to process data that is stored in the persistent storage 120. This application may cause executable instructions to be executed by the processing units 104 as one or more threads in the thread blocks 106 in the graphics processing unit 102. The threads may include functions and other code from the file system library 108, which may be referred to as the file system service.

For the graphics processing unit 102 to begin to read data from a file so that the processing unit 104 can begin processing the data, the file must first be opened and a file buffer initialized for reading and writing the data. Thus, a thread may utilize an open call from the file system library 108. The effect of the open call may be to create a file buffer (if not already created), allocate a file descriptor to the file being opened, and insert the file descriptor into an index of active file descriptors contained within the file buffer. The file buffer may be a structure containing cache buffers for data read from the file system and at least one write buffer, such as a ring buffer, for data being written to the file system. The buffers in the file buffer may be regions in the system memory 110 that are the input/output memory management unit 112 to the instance memory 122. Each use of the open call for the particular file by a different thread may increment a concurrent use counter, which indicates which and how many threads are concurrently using the particular file.

After the file has been opened, the threads in the thread blocks 106 may read blocks of data from persistent storage by utilizing a read call from the file system library 108 specifying the file descriptor of the file containing the data. The effect of the read call may be to first check whether the data being sought is already present within the cache buffers of the file buffer. If so, the threads may retrieve the data directly from the cache buffers. Otherwise, a read page may be allocated to the cache buffers of the file buffer—this read page being located in the system memory 110 that is been mapped by the input/output memory management unit 112 to instance memory 122 of the instance 114. The read call may also cause a message to be placed in the message queue 118, indicating that a central processing unit of the host computing system should populate the system memory 110 associated with the page with the data from the file corresponding to the file descriptor. The placement of the message in the message queue 118 may trigger the central processing unit to populate the read page as requested.

As the graphics processing unit processes the data, the processed data may need to be output to an output file. This may be accomplished by the threads in the thread blocks 106 to utilize a write call from the system library 108. The write call may cause the threads to write the process data to the system memory address of a write buffer of the file buffer, which, as noted, may be mapped to the instance memory 122 of the instance 114. Once the process data has been written to the write buffer, the write call may additionally cause a message to be placed in the message queue 118 indicating that the data at the instance memory 122 address is ready to be written to persistent storage 120. The placement of the message in the message queue 118 may trigger the appropriate entity to copy the process data to the persistent storage 120 as requested.

When the threads of the thread blocks 106 are finished reading from a particular file, the threads may utilize a close call from the system library 108 to close their access to the file. Each use of the close call for the particular file may cause the concurrent use counter associated with that particular file to be decremented. When the concurrent use counter has been decremented to zero, it can be determined that all of the threads that were using the particular file are finished with the particular file, and as a result the file descriptor associated with the particular file can be removed from the index of active file descriptors in the file buffer.

Figure 2:
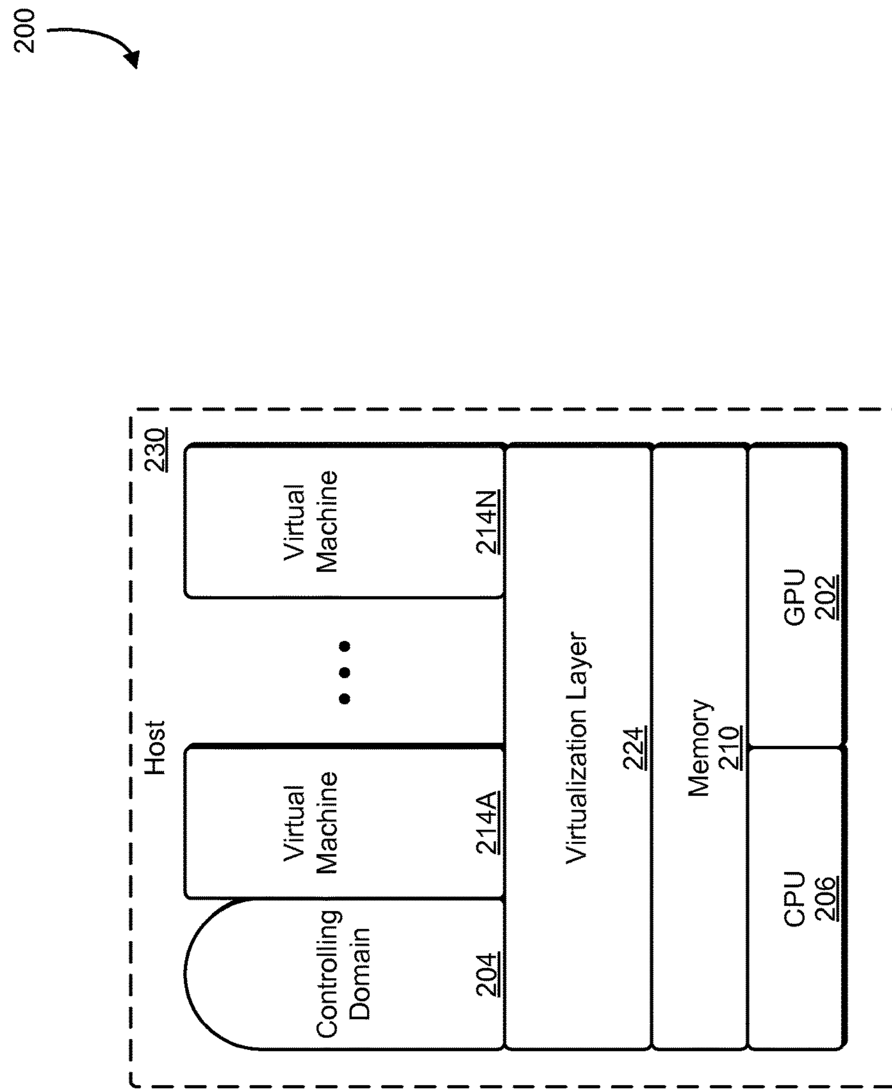
FIG. 2 illustrates an example of a host computing system with a graphics processing unit in accordance with an embodiment.

FIG. 2 illustrates an aspect of an environment 200 in which an embodiment may be practiced. Specifically, FIG. 2 illustrates the components of a computing system 230 hosting one or more of virtual machines 214A-14N that may utilize at least one graphics processing unit 202 in a manner in accordance with the present disclosure. As noted, the host computing system 230 includes system hardware, such as one or more central processing units 206, the at least one graphics processing unit 202, and memory 210. Running as software or hardware may be a virtualization layer 224, and running under the virtualization layer 224 may be the one or more virtual machines 214A-14N, one of which may be a controlling domain 204.

The controlling domain 204 may be a privileged virtual machine instance from which the one or more virtual machines 214A-14N of the virtualization layer 224 may be managed. Unlike the one or more virtual machines 214A-14N, the controlling domain 204 may have direct access to the system hardware (e.g., network interface controllers, hard drives, memory, etc.). The virtualization layer 224 may enable the system hardware 228 to be used to provide computational resources upon which the one or more virtual machines 214A-14N may operate. The virtualization layer 224 may be any device, software or firmware used for providing a virtual computer platform for the one or more virtual machines 214A-14N. An example of the virtualization layer 224 is a hypervisor. The one or more virtual machines 214A-14N may be provided to customers of the computing resource service provider, and the customers may run operating systems, applications and/or other such computer system entities on the one or more virtual machines 214A-14N.

The system hardware may include the hardware of a physical (i.e., non-virtual) computing device configured to execute instructions for performing data computation, manipulation, or storage tasks. The system hardware may include the one or more central processing units 206, the at least one graphics processing unit 202, the memory 210, including static and dynamic memory, buses, and input and output ports that are compliant with any handshaking, communications or data transfer protocol. The system hardware may also include file system storage devices, such as storage disks and tapes, and/or networking equipment. The virtualization layer 224 may enable the system hardware to be used to provide computational resources upon which the one or more virtual machines 214A-14N may operate.

The memory 210 may include a number of memories including a main random access memory for storage of instructions and data during program execution and a read only memory in which fixed instructions may be stored. The one or more central processing units 206 may be any suitable processing device, such as one or more of a microprocessor, a co-processor, a micro-controller, a microcomputer, a central processing unit, application specific integrated circuit, custom reduced instruction set computing chip, or some other programmable logic device. Examples of such processing devices include devices based on Intel x86 architecture, Itanium architecture, reduced instruction set architecture (including ARM, Power Architecture and Blackfin architectures), and SPARC architecture. The at least one graphics processing unit 202 may be at least one graphics processing unit similar to the graphics processing unit 102 described in FIG. 1. That is, the computing system 230 may include a plurality of graphics processing units, one or more of which may be assigned to an individual virtual machine of the one or more virtual machines 214A-14N. In some embodiments, one or more of the graphics processing units may be assigned to the virtual machine for the life of the virtual machine, whereas in other implementations, graphics processing units may be dynamically assigned and reassigned to any of the one or more virtual machines 214A-14N, based on the needs of the respective virtual machine. Thus, an individual virtual machine of the one or more virtual machines 214A-14N may, at any given time, utilize a plurality of graphics processing units in the manner described in the present disclosure.

Figure 3:
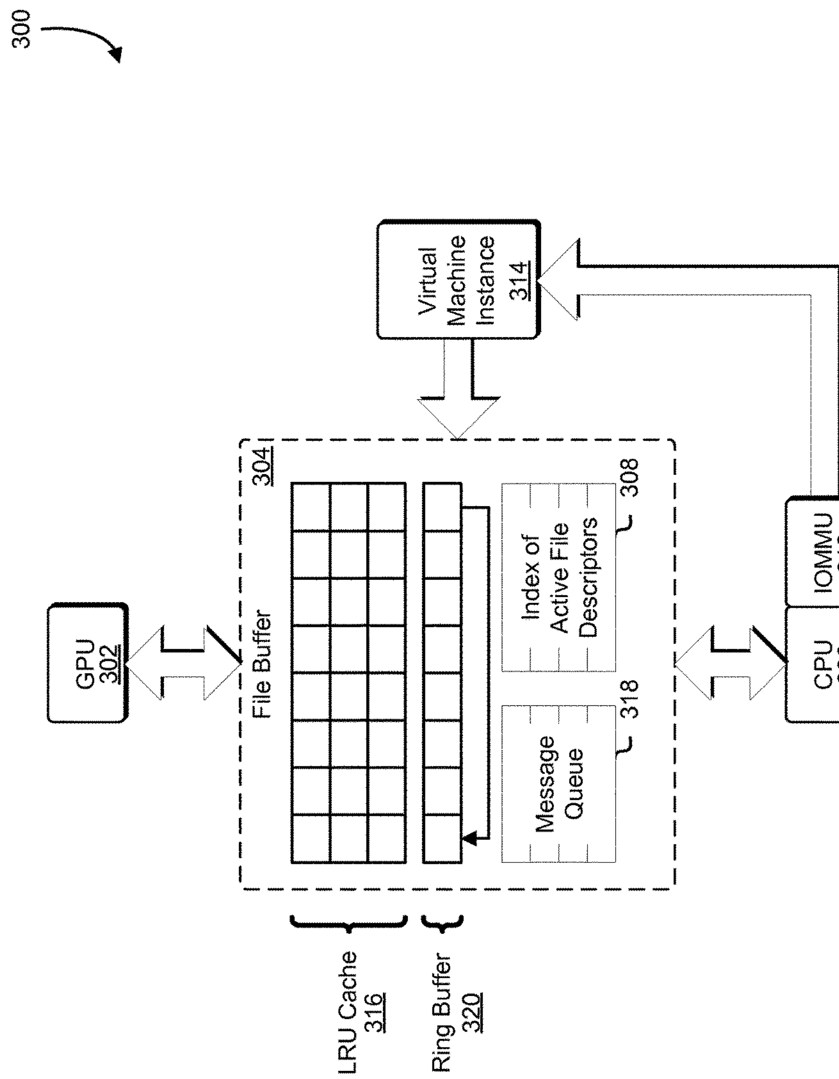
FIG. 3 illustrates an example of a file buffer in accordance with an embodiment.

FIG. 3 illustrates an example 300 of a file buffer 304 component of the file system service of the present disclosure. When an open call is first received by the file system service of the present disclosure from a thread of a block of threads, the file system service may initialize the file buffer 304. The file buffer 304 may include a memory region both available to a graphics processing unit 302 of a computing system configured to have virtualization manager for hosting one or more virtual machines and available to a central processing unit 306 of the computing system. The file buffer 304 may also include an index of active file descriptors 308, an operation message queue 318, a least recently used cache of read pages 316, and a ring buffer 320 of write pages. In some embodiments, the file buffer also includes an input/output memory management unit 312 capable of translating memory addresses between virtual memory addresses and memory addresses of the host computing system itself. Once the file buffer is initialized, the file system service may add the allocated file descriptor to the index of active file descriptors 308.

The graphics processing unit 302 may be an electronic circuit configured to process sets of data in a highly parallel fashion. In some examples, "highly parallel" may refer to performing a set of operations (i.e., performing the same or similar executable instructions) in parallel and in lockstep with each other, although the operations may be being performed on different data. As noted, the file buffer 304 may be a structured configured to receive, cache, and provide data from a file system to a graphics processing unit, and write data received from a graphics processing unit back to the file system. The central processing unit 306 may be an electronic circuit configured to execute executable instructions for the host computer system. The central processing unit 306 in the example 300 is intended to depict the physical processor of the host computing system.

The index of active file descriptors 308 may be a list of file descriptors (e.g., distinct integers) indicating which files are in use by the file system service of the present disclosure. As new files are opened in response to open calls received by the file system service from threads running on the graphics processing unit 302, file descriptors associated with the new file may be added to the index of active file descriptors 308. Conversely, as the threads running on the graphics processing unit 302 submit close calls to the file system service for specified files, the file descriptors associated with the specified files may be removed from the index of active file descriptors 308.

The input/output memory management unit 312 may be a memory management unit that translates physical memory addresses of the host computing system to virtual memory addresses, such as the input/output memory management unit 112 of FIG. 1. The ring buffer 320 for write pages may be a buffer configured to receive processed data from threads of the graphics processing unit 302. The ring buffer 320 may be system memory of the host computing system that has been mapped to virtual memory of the virtual machine instance 314 by the input/output memory management unit 312, thereby rendering it accessible to the graphics processing unit 302, the virtual machine instance 314, and/or the central processing unit 306. The ring buffer 320 may be configured to be written to by the graphics processor 302 and read from by the virtual machine instance 314 and/or the central processing unit 306.

The least recently used cache 316 for read pages may be one or more buffers in system memory that have been mapped to virtual memory of the virtual machine instance 314 by the input/output memory management unit 312, thereby rendering it accessible to the graphics processing unit 302, the virtual machine instance 314, and/or the central processing unit 306. The released recently used cache 316 may be configured to be written to by the central processing unit 306 and/or the virtual machine instance 314, and read from by the graphics processing unit 302. The virtual machine instance 314 may be a virtual machine similar to the virtual machines 214A-14N of FIG. 2 configured to run applications that perform processing using the graphics processing units 302.

Figure 4:
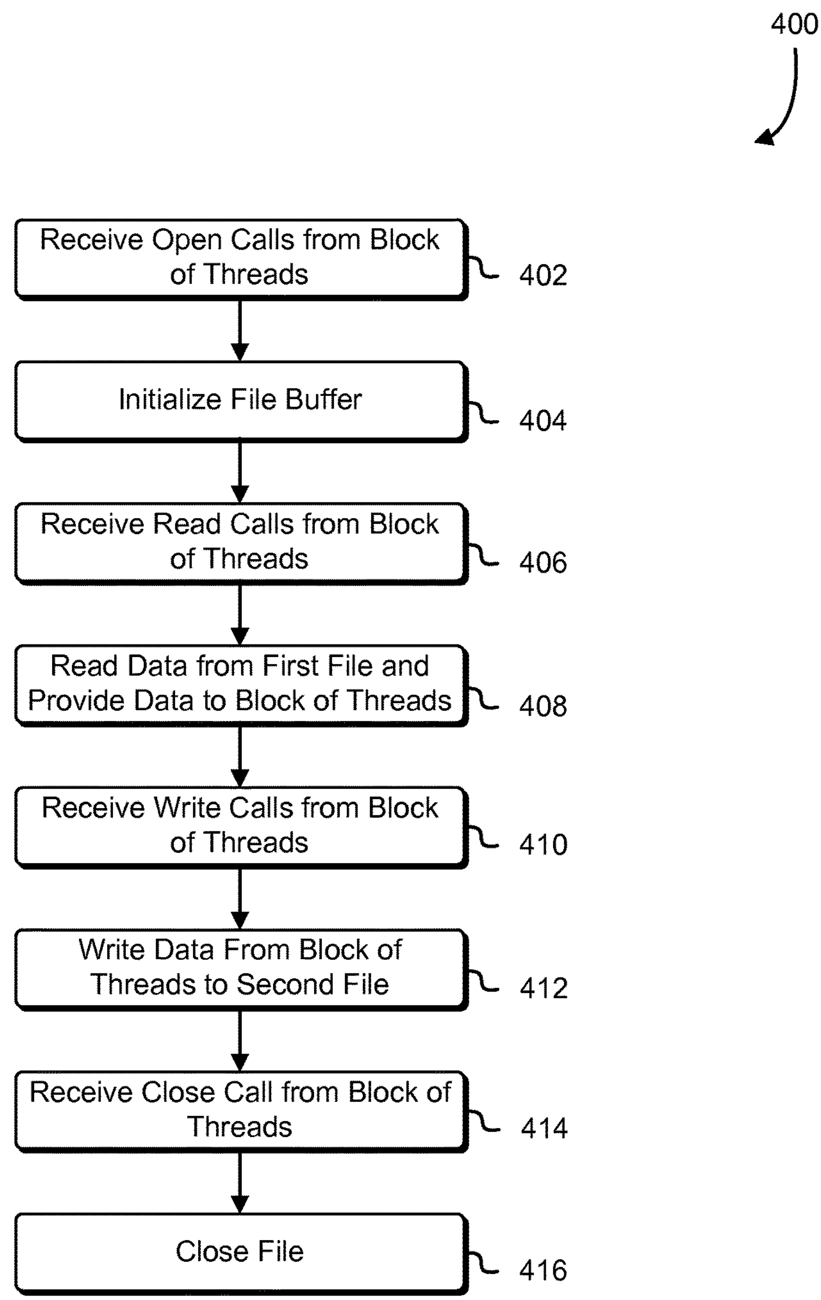
FIG. 4 is a flowchart that illustrates the workflow of accessing a file in accordance with an embodiment.

FIG. 4 is a flowchart illustrating an example of a process 400 for opening a file, reading a file, and closing a file in a file system for a highly parallel processing unit, such as a graphics processing unit, in accordance with the present disclosure. The process 400 further includes operations for writing data processed by the graphics processing unit to another file in the file system. The process 400 may be performed by any suitable system such as a server in a data center, such as the web server 906 or the application server 908 of FIG. 9, multiple computing devices in a distributed system of a computing resource service provider, or any electronic client device such as the electronic client device 902 described in conjunction with FIG. 9.

In 402, a set of open calls are received from a block of threads performing operations in a processor in lockstep with each other. The set of open calls may all be directed to opening a particular file for access to the file by the particular thread. If a file buffer of the sort described in FIG. 3 has not already been initialized, in 404, the file buffer may be initialized upon receipt of the first open call of the set of open calls. Subsequent open calls requesting access to the particular file may instead increment a concurrent use counter in the file buffer that indicates which and how many threads of the set of threads are concurrently using the file. The operations of 402-04 are further described in reference to FIG. 5.

The operations of 406 occur when the block of threads actually requests to read data from the file opened in 402-04. Each of the threads may read a block of data from a portion of the file offset by a predetermined amount based at least in part on an identifier of the thread and/or the concurrent use counter associated with the thread, and a block size. In 408, the data may be copied from persistent storage into the least recently used cache buffers in the file buffer initialized in 404. Once the data is in the least recently used cache buffers in the file buffer, the data may be read by the graphics processing unit. The operations of 406-08 are further described in reference to FIG. 6.

As the read data is processed, in 410, the block of threads may, output the processed data to a file by executing a set of write calls containing the processed data. The processed data may be written by the graphics processing unit to a ring buffer of the file buffer of 404. Once the ring buffer is full or once it is determined that the ring buffer should be flushed, the processed data in the ring buffer may be flushed to the output file in 412. The operations of 410-12 are further described in reference to FIG. 7.

Once the block of threads has finished reading from the input file, a set of close calls may be received from the block of threads. As each thread makes its close call, the concurrent use counter of 404 may be decremented. Once the concurrent use counter reaches zero, in 416 the input file may be closed by removing its file descriptor from the index of active file descriptors of 404. The operations of 414-16 are further described in reference to FIG. 8.

Figure 5:
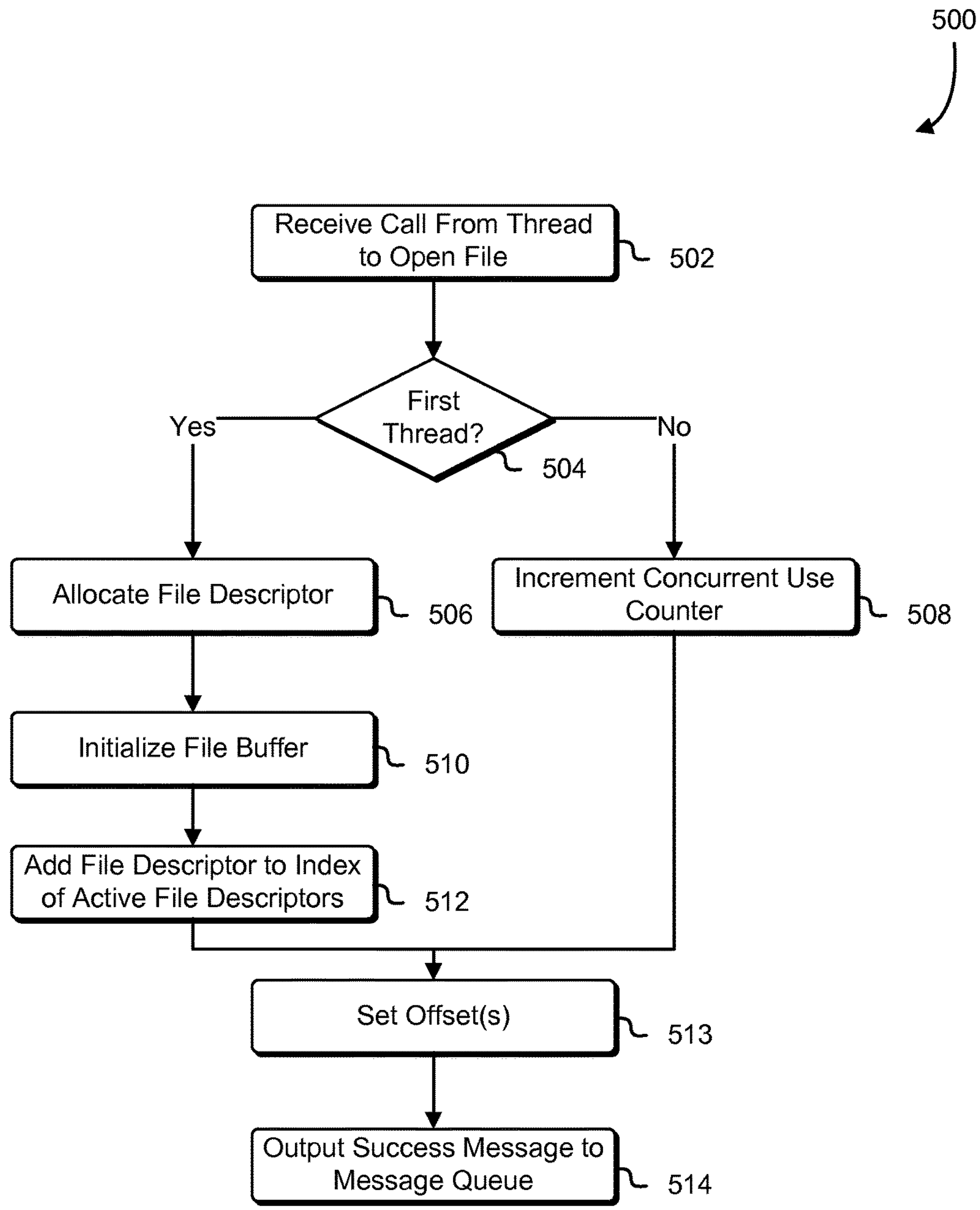
FIG. 5 is a flow chart that illustrates an example of an open and initialize call in accordance with an embodiment.

FIG. 5 is a flow chart illustrating an example of a process 500 for opening and initializing file buffer in response to the file system service of the present disclosure receiving an open call in accordance with various embodiments. The process 500 may be performed by any suitable system such as a server in a data center, such as the web server 906 or the application server 908 of FIG. 9, multiple computing devices in a distributed system of a computing resource service provider, or any electronic client device such as the electronic client device 902 described in conjunction with FIG. 9. The process 500 includes a series of operations wherein an open call is received, a file descriptor is allocated to a thread or, if the file descriptor has already been allocated, a concurrent use counter is incremented, a file buffer is initialized, and a file descriptor is added to an index of active file descriptors.

In 502, a call may be received by the system performing the process 500 from a thread of a block of threads to open a specified file. The block of threads in this context may represent the executable code of a graphics processing unit application. The open call may be a set of library code that is joined with the application at compile time. However, it is contemplated as within the scope of the present disclosure that, in some embodiments, the library code functionality and/or file system service could be integrated into hardware, and therefore it could be accessible by the processing units 104 outside of the executable code. In either embodiment, the open call received in 502 could be one of a plurality of open calls being received; that is, each core in the block of threads may effectively issue an open call to the same file.

In 504, the system performing the process 500 may determine whether it needs to allocate a new file descriptor for the particular file specified by the call received in 502 that is being opened or whether a file descriptor has already been allocated for the particular file. For example, the system performing the process 500 may be configured to allocate a file descriptor upon receiving an open call for a particular file from a first thread in a block of threads. The file descriptor may be an indicator that indicates the particular file that is being opened.

Thus, if the open call received from a thread of a block of threads in 502 is the first open call received for the particular file, in 506, a file descriptor for the particular file may be allocated to the block of threads. Otherwise, if a first thread has already caused the file descriptor to be allocated for the particular file and the call in 502 was received from a subsequent thread of the block of threads, in 508, a concurrent use counter for the particular file may be incremented. The concurrent use counter, therefore, effectively indicates the number of threads that are simultaneously using the particular file.

In 510, after allocating the file descriptor, a file buffer may be initialized. The file buffer in this context may be an allocation of memory shared between the graphics processing unit and of virtual machine instance running under a virtualization manager, such as a hypervisor. The file buffer in this context may be utilized to marshal data between the graphics processing unit and the virtual machine instance without having to load the entire contents of persistently store data into the graphics processing unit at once, thereby conserving the limited amount of graphics processing memory needed for other application tasks. Thus, the file buffer may be used for storing only the portion of the file system relevant to the current computation being performed by the graphics processing unit, and other portions of the file system may be stored elsewhere (e.g., virtual memory of the virtual machine, persistent storage outside of memory, etc.).

The file buffer may be a region of physical system memory of the computing system hosting the virtual machine instance, and may be available to both the graphics processing unit and the virtualization manager managing the virtual machine instance. Stored within the file buffer may be a set of active file descriptors; that is, a list of file descriptors for currently open files. Consequently, in 512, the file descriptor allocated in 506 may be added to the set of active file descriptors within the file buffer.

In 513, one or more offsets associated with the file and/or thread may be computed. In some embodiments, a single file descriptor can be allocated to a block of threads and an identifier can be associated with each core or each thread in the block of threads, as noted above. The file descriptor may have an associated global file offset, which may indicate a starting position in the file for the block of threads. For example, as each block of threads completes its read operations, the global file offset may be moved to a new position so that the next block of threads can begin reading at the new position. Additionally or alternatively, each block of threads of the plurality of blocks of threads may be associated with a different global file offset in the file; in this manner, the plurality of blocks of threads may be reading from the same file, but at different starting locations. The file descriptor may also be associated with one or more local file offsets, where each of the local file offsets corresponds to an individual thread in the block of threads. For example, for a global file offset of 100 and a spacing between threads of 16 bytes, a local file offset for a first thread may be zero, for a second thread may be 16 bytes, for a third thread may be 32 bytes, for a fourth thread may be 48 bytes, and so on. In this manner, the read position for a thread may be computed by adding the global file offset to the respective local file offset of the thread. In this example, the first thread would start at location 100 in the file, the second thread would start at location 116 in the file, the third thread would start at location 132 in the file, the fourth thread would start at location 148 in the file, and so on.

In the above example, each local file offset is increased for each requesting thread by an amount corresponding to the spacing between threads. Alternatively, a local file offset may be determined dynamically based on a global file offset, the thread identifier (ID), and the spacing, using a formula similar to:

$$location=globalOffset+(threadID\times spacing)$$

For example, given a global file offset of 100, and a spacing of 16 bytes, a thread with an ID of 0 would yield a location of 100, a thread with an ID of 1 would yield a location of 116, a thread with an ID of 48 would yield a location of 868, and so on. In this alternate example, only the global file offset and the spacing need to be stored, as the location can be calculated dynamically based on the requesting thread's ID. It is contemplated as within the scope of the present disclosure that other methods for determining where in a file a thread should read may be used.

As noted, the system of the present disclosure may have a message queue, similar to the message queue 118 of FIG. 1, for exchanging operation messages between the graphics processing unit and a central processing unit of the host computing system for coordinating file system activity. Hence, in 514, the system performing the process 500 may output to the message queue an indication of successfully opening the specified file for the thread.

The file buffer may also include a least recently used cache for caching read pages. The least recently used cache may be used for caching read pages so that not all graphics processing unit operations necessarily require pages to be loaded from external storage. In this manner, the least recently used cache of the file buffer may mimic a file system cache used by an operating system. Note that other caching strategies are also contemplated as within the scope of the present disclosure.

The file buffer may additionally have a ring buffer for holding write pages. The ring buffer may be used as write cache for caching writes (i.e., changes) to the file system. Like the least recently used cache for reads, the write cache may be similar to operating system implementations of file systems so that when the graphics processing unit writes processed data, the data need not be committed to persistent storage immediately. The write cache may be flushed to persistent storage later in an efficient manner and in a manner that minimizes the risk of data loss in the event of a system crash (e.g., loss of power, application error, hardware malfunction, etc.).

An input/output memory management unit may aid in optimizing the exchange of data between the virtual memory of the virtual machine instance and a virtualization manager (e.g., a hypervisor) managing the virtual machine instance. The input/output memory management unit may be a hardware or software component for translating a physical memory address of the host computing system to a virtual memory address of the virtual machine. The input/output memory management unit may be included as part of the central processing unit of the host machine running the virtualization manager. The input/output memory management unit may provide a fast and efficient way of directly writing to memory without involving the virtualization manager in the marshaling process. Thus, using the input/output memory management unit, the graphics processing unit can bypass the virtualization manager and write directly into system memory, and the virtual machine can read the data as though it was written to the virtual memory. However, it is contemplated as within the scope of the present disclosure that, rather than an input/output memory management unit, the virtualization manager may assume the responsibility of translating between the virtual memory of the virtual machine instance and the physical memory of the host computing system. Note that one or more of the operations performed in 502-14 may be performed in various orders and combinations, including in parallel.

Figure 6:
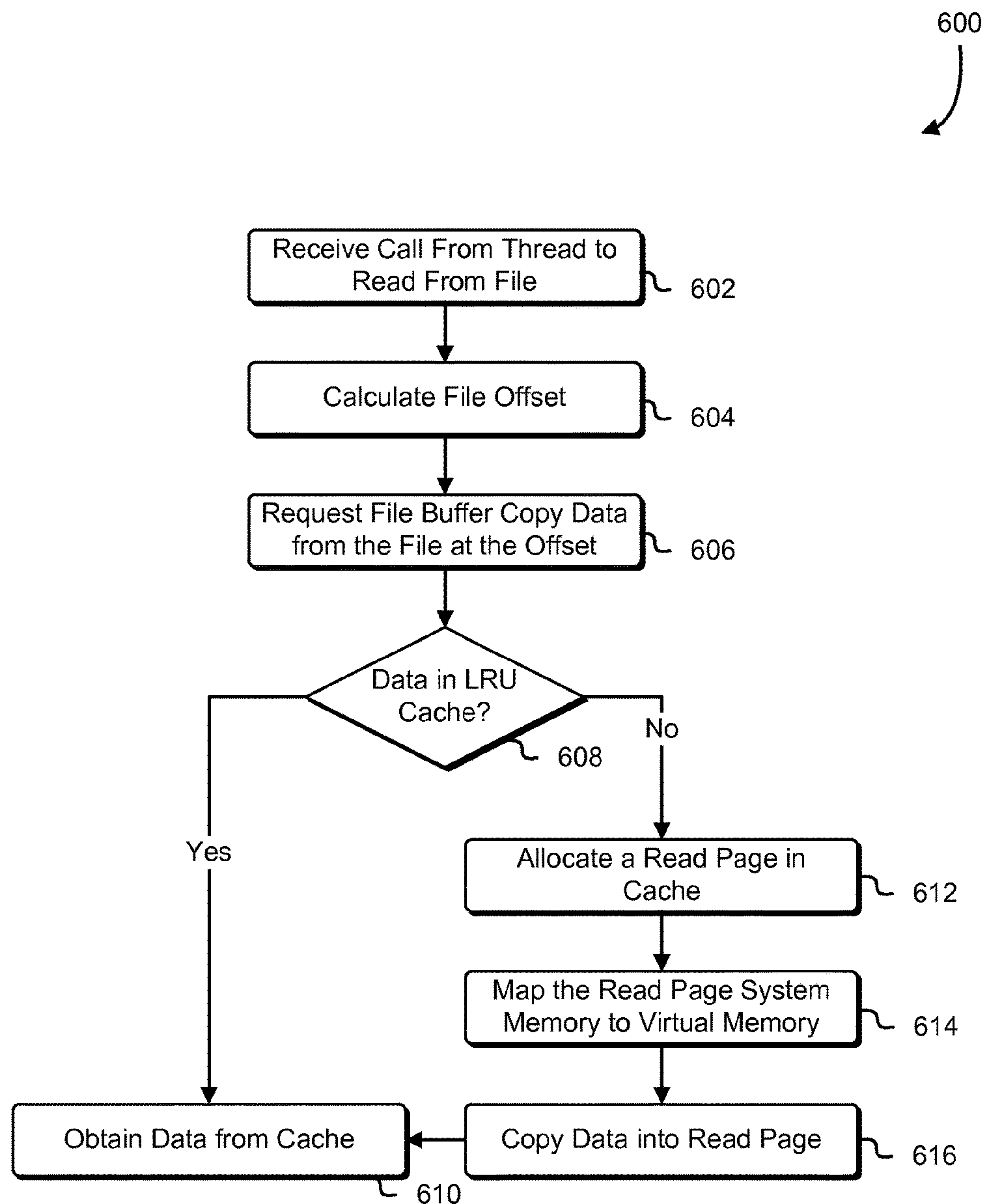
FIG. 6 is a flow chart that illustrates an example of a read call in accordance with an embodiment.

FIG. 6 is a flowchart illustrating an example of a process 600 for reading from a specified file in response to the file system service of the present disclosure receiving a read call in accordance with various embodiments. The process 600 may be performed by any suitable system such as a server in a data center, such as the web server 906 or the application server 908 of FIG. 9, multiple computing devices in a distributed system of a computing resource service provider, or any electronic client device such as the electronic client device 902 described in conjunction with FIG. 9. The process 600 includes a series of operations wherein a read call is received from the thread and a determination is made whether the data requested by the read call is already in the least recently used cache. If data is in the cache, obtain it from the cache, and if not, copy it into cache, and obtain it.

In 602, a call may be received by the system performing the process 600 for the thread of a block of threads to read from a file that was opened by a process similar to the process 500 of FIG. 5. Similar to the open call of the process 500, the read call may be a set of library code that have been joined with the graphics processing unit application at compile time, or may be integrated into hardware outside of executable code. Although the thread of the block of threads may be operating in parallel, each thread of the block of threads may individually issue such a read call, albeit possibly in lockstep with each of the other threads of the block of threads. Each read call may include information usable to compute the location in the file from which data is to be read, such as a thread ID and/or local file offset. Additionally or alternatively, flow control offsets may be provided with the read call as well. Based on this included information, in 604, an offset/address within the file may be computed specifically for the individual thread. Then, in 606, the system performing the process 600 may query the file buffer for the data at the particular offset/address in the file.

In 608, the system performing the process 600 may examine its least recently used cache for the requested data. If the requested data is found, the system may proceed to 610, whereupon the contents of the file at the specified location may be obtained from the cache provided to the requesting thread in response to its read request. Otherwise, if the requested data is not found in the least recently used cache, the system may proceed instead to 612.

Thus if the data is not found in the least recently used cache, in 612, system performing the process 600 may begin the process of obtaining the requested data from wherever it resides. First, the system may allocate a read page in cache by making a call to an input/output memory management unit, with the call specifying an address in physical memory of the host computing system to which a virtual memory address should be mapped. This address will be used for storing the retrieved data. In response, in 614, the input/output memory management unit should map the system memory address for the read page to a virtual memory address. In this way, by copying the data to system memory address, the data may be made accessible to the virtual machine instance performing the operations.

In 616, an operation message may be provided to the operation message queue instructing the central processing unit to populate the memory at the specified address allocated for the read page with the data being requested by the graphics processing unit. As shown in the embodiment depicted in FIG. 1, the operation message queue resides within the virtual machine instance. Therefore, the specified address may be the address in virtual memory, and consequently a memory management unit may translate the virtual memory address into a system address of the host computer system usable by the central processing unit. The central processing unit may have access to the message queue and may poll the message queue periodically for messages. Alternatively or additionally, in some implementations, the central processing unit may check the message queue for messages upon the occurrence of certain predetermined events, such as a call to an input/output memory management unit. While the data is being retrieved from its current location, the operations being performed by the graphics processing unit may be stalled until the data is copied to the specified address. Thus, it may be preferable in most cases for the data to be found within the least recently used cache. However, in some embodiments, a "do not cache" flag can be optionally included. For example, in some cases it might be desired to perform a non-caching read operation when it is known that the data is only going to be read infrequently (e.g., once). In these cases, it the thread may pass a "do not cache" flag/instruction when requesting the data, and the data may be provided to the thread without being stored in the least recently used cache of the file buffer. Note too that one or more of the operations performed in 602-16 may be performed in various orders and combinations, including in parallel.

Figure 7:
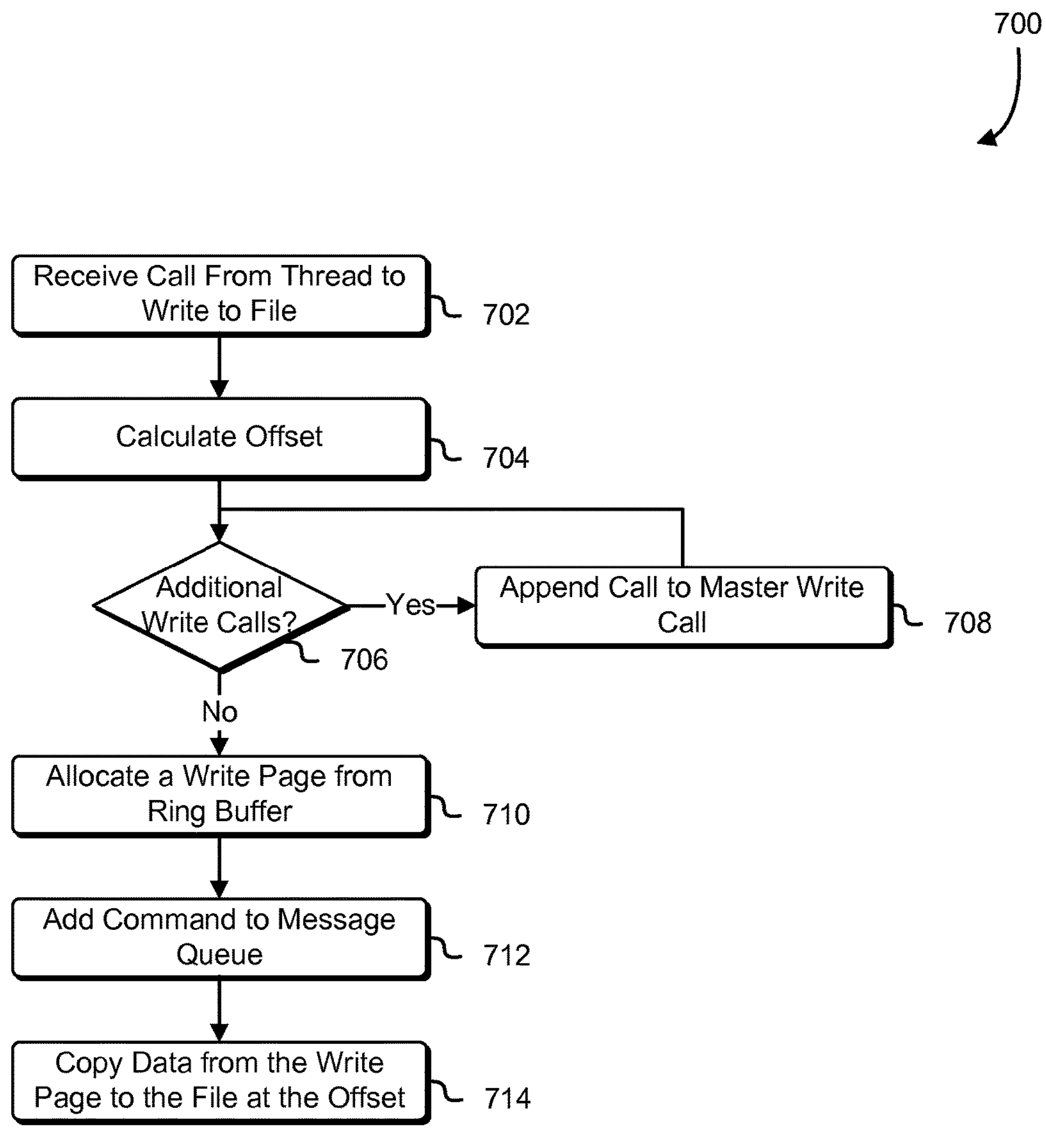
FIG. 7 is a flow chart that illustrates an example of a write call in accordance with an embodiment.

FIG. 7 is a flowchart illustrating an example of a process 700 for writing data in in response to the file system service of the present disclosure receiving a write call in accordance with various embodiments. The process 700 may be performed by any suitable system such as a server in a data center, such as the web server 906 or the application server 908 of FIG. 9, multiple computing devices in a distributed system of a computing resource service provider, or any electronic client device such as the electronic client device 902 described in conjunction with FIG. 9. As noted, for other calls of the present disclosure, the write call may be a set of library code joined with the application at compile time, although it is contemplated as within the scope of the present disclosure that, in some embodiments, the library code functionality and/or file system service would be integrated into hardware and consequently be accessible outside of the code executing in the cores of the graphics processing unit. Furthermore, the write call may be one of the plurality of write calls being received by the system from threads; in other words, each core executing threads of the block of threads, because the block of threads may be operating in lockstep/in parallel, may all be issuing write calls to the same file at approximately the same time. The process 700 includes a series of operations wherein a call is received from a thread to write data to a file, and offset is calculated, data is written to a ring buffer, and the ring buffer is flushed to persistent storage. In some embodiments, such as the one depicted in FIG. 7, data from multiple write calls received from multiple threads are allowed to accumulate in the ring buffer so that the blocks of data can be written to file all at once, which may be referred to as a "master write," rather than written as a series of discrete writes.

Having processed data read by way of the process 600 of FIG. 6, a thread may be ready to write the processed data. To that end, in 702, the system performing the process 700 may receive a write call from the thread to write the processed data to the file system. As with the processes 500 and 600 of FIGS. 5 and 6, the thread may be one of a block of threads performing operations in parallel. Consequently the system may be receiving additional write requests while it is performing the process 700 for the requesting thread. Similar to the manner in which an input file was read from in the process 600, each thread may be allocated an offset in an output file. In a similar manner as offsets were determined in the process 500, the offsets of the process 700 may be calculated in 704 from a number of different sources, including a global file offset for the file, one or more local file offsets, and/or any explicit offsets specified by the write call. Similar to the global file offset for an input file, the global file offset may represent a starting point in the output file for a particular block of threads.

In order to minimize the number of writes actually being performed, the system performing the process 700 may attempt to combine as many individual writes by the graphics processing unit to the central processing unit as possible. To this end, in 706, the system may check whether additional write calls have been received, and, if so, proceed to 708 to combine the plurality of write calls into a single master write call. For example, if each thread of a thread block of 256 threads writes 16 bytes of data (e.g., effectively meaning that each write address is offset by 16 bytes), rather than performing 256 writes of 16 bytes apiece, the system performing the process 700 may repeat the operations of 706-08 to combine the 256 writes into a single 4 kilobyte write. In some implementations, it may be preferable to accumulate multiple sets of write commands from thread blocks in order to a mass an even larger master write. In other words, rather than writing the single 4 kilobyte write, the operations of 702-08 may be repeated until the size of the master write exceeds a threshold, such as 4 megabytes. The determination whether to flush the contents of the master write to storage may be triggered by a variety of factors, including that the ring buffer becomes full, that a threshold amount of time has passed since a previous write to the ring buffer, that a threshold amount of time has passed since the first data written to the ring buffer was written, or according some other set of rules configured to minimize an amount of data loss in the event of a power loss or other catastrophic event. Hence, in some cases, based on such criteria, the master write may be forced even though more write calls may be pending.

In 710, once it is determined in 706 that enough write calls have been received to trigger the system performing the process 700 to stop accumulating more writes, the system may proceed to 710 in order to begin the process of committing the received data to the file system. First, the system may allocate a write page for a ring buffer that will be used to receive the data that is currently located in local memory of the graphics processing unit. Similar to the operations of 612-14, the write page may be allocated in system memory of the host computing system and mapped by the input/output memory management unit to virtual memory of the virtual machine instance so that, for the lifespan of that mapping, the memory region may be directly available by both of the graphics processing unit as well as by the central processing unit. In some embodiments, once the write page is full, the write page is rendered 'read only' (i.e., locked) to the virtual machine in order to prevent the graphics processing unit from modifying the written data until the central processing unit is able to read the data from the write page.

In 712, the virtual memory address for the write page may be provided to the message queue with the command to commit the write page to the file system (whether that file system is persistent storage or an in-memory file system of the host computing system). In some embodiments, additionally or alternatively, instead of having an out-of-band channel for communicating messages to and from a file system driver of the virtual machine instance, such as the message queue, the system performing the process 700 is configured to directly access the ring buffer on a periodic or event driven basis (or according to some other scheme) to determine whether there is data in the ring buffer that should be written to the file system. An advantage of the message queue embodiment may be lower power consumption, because the system performing the process 700 may not need to continually poll to determine whether data needs to be written to a file system, and instead only wake up when a message appears in the message queue.

In 714, as a result of detecting that data is ready to be written to a file system, such as by the aforementioned message appearing in a message queue, the system performing the process 700 may cause the data to be written from the write page to the file at the location corresponding to the calculated offset of 704. Note that one or more of the operations performed in 702-14 may be performed in various orders and combinations, including in parallel.

Figure 8:
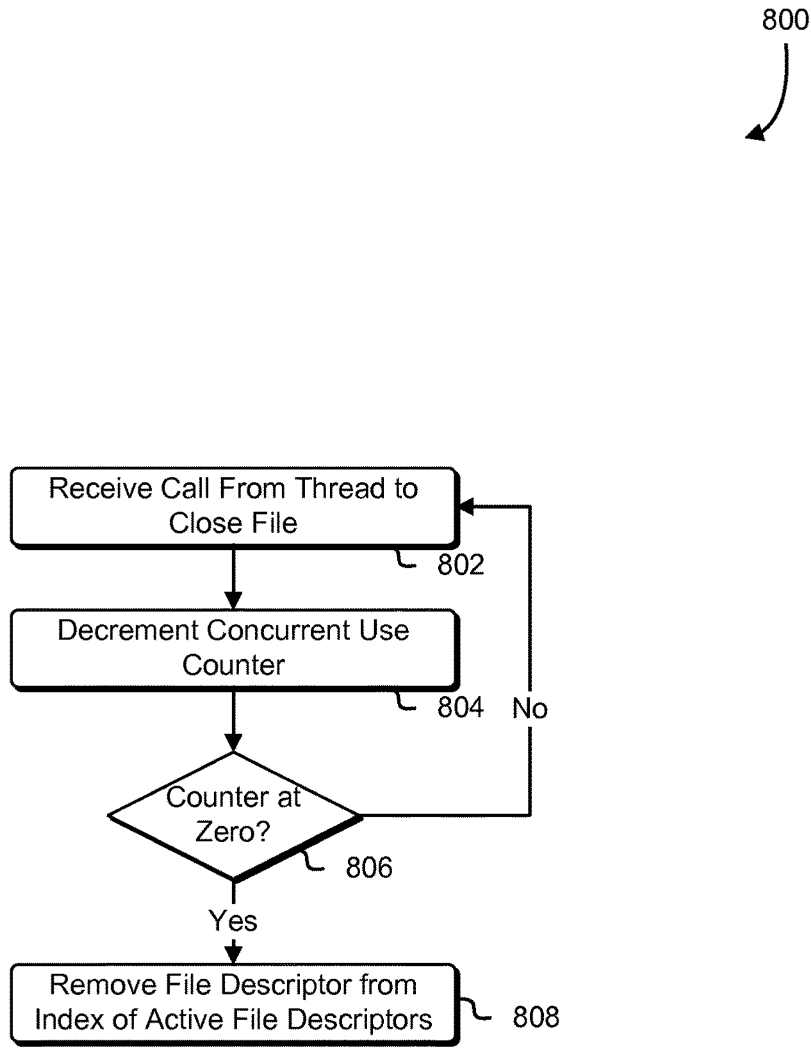
FIG. 8 is a flow chart that illustrates an example of a close call in accordance with an embodiment.

FIG. 8 is a flowchart illustrating an example of a process 800 for closing a file buffer in response to the file system service of the present disclosure receiving a close call in accordance with various embodiments. The process 800 may be performed by any suitable system such as a server in a data center, such as the web server 906 or the application server 908 of FIG. 9, multiple computing devices in a distributed system of a computing resource service provider, or any electronic client device such as the electronic client device 902 described in conjunction with FIG. 9. The process 800 includes a series of operations wherein a close call is received from a thread performing a graphics processing unit operation, a concurrent use counter is decremented, and if the thread is the last thread of a thread block to make the close call, the relevant file descriptor may be removed from an index of active file descriptors.

After the graphics processing unit application has finished processing data from a file, in 802, call may be received by the system performing the process 800 from a thread of a block of threads to close said thread's access to a specified file. As noted, the block of threads in this context may represent the executable code of a graphics processing unit application. Also as noted, the close call may be a set of library code that is joined with the application at compile time, although it is contemplated as within the scope of the present disclosure that, in some embodiments, the library code functionality and/or file system service is integrated into hardware, and is consequently accessible outside of the executable code. Furthermore, the close call may be one of a plurality of close calls being received from threads; in other words, each core executing threads of the block of threads, because they may be operating lockstep/in parallel, may all be issuing close calls of the same file at approximately the same time. The close call may indicate, as a parameter, a file descriptor for the file for which the threads access is being closed.

In 804, the concurrent use counter that was initialized and/or incremented in the operations of 508 of FIG. 5 may be decremented, effectively indicating that one less thread is accessing the file. As each thread of the block of threads issues its close call, eventually the concurrent use counter will reach zero. Hence, in 806, the system performing the process 800 determines whether the last of the threads which were accessing the file associated with the file descriptor has issued the close command (i.e., whether the concurrent use counter is now at zero). If not, the system performing the process 800 may return to 802 to wait to receive another close call from a thread that is still accessing the file.

Otherwise, if the concurrent use counter has been decremented to zero, no more threads of the block of threads need access to the file associated with the file descriptor, and the system performing the process 800 may proceed to 808, whereupon the file descriptor may be removed from the index of active file descriptors. By removing the file descriptor from the index of active file descriptors, the file is effectively marked as no longer being in use by the graphics processing unit. Note that one or more of the operations performed in 802-08 may be performed in various orders and combinations, including in parallel.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 9:
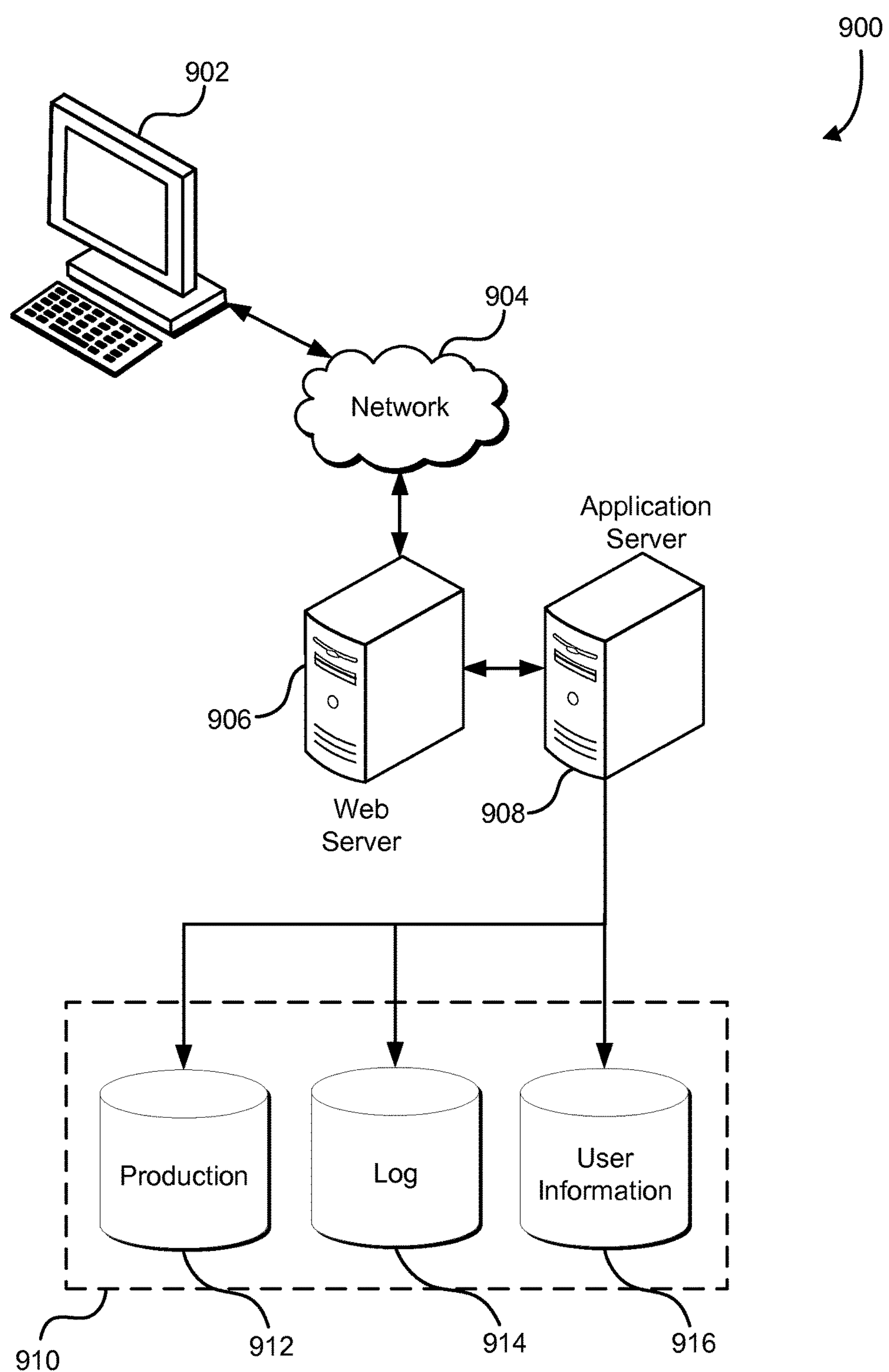
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 904 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 904 can be enabled by wired or wireless connections and combinations thereof. In this example, the network 904 includes the Internet, as the environment includes a web server 906 for receiving requests and serving content in response thereto, although for other networks an alternative device serving a similar purpose could be used as would be apparent to one of ordinary skill in the art.

The illustrative environment includes an application server 908 and a data store 910. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 908 can include any appropriate hardware, software and firmware for integrating with the data store 910 as needed to execute aspects of one or more applications for the electronic client device 902, handling some or all of the data access and business logic for an application. The application server 908 may provide access control services in cooperation with the data store 910 and is able to generate content including, text, graphics, audio, video and/or other content usable to be provided to the user, which may be served to the user by the web server 906 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 902 to provide the content in one or more forms including, forms that are perceptible to the user audibly, visually and/or through other senses including touch, taste, and/or smell. The handling of all requests and responses, as well as the delivery of content between the electronic client device 902 and the application server 908, can be handled by the web server 906 using PHP: Hypertext Preprocessor ("PHP"), Python, Ruby, Perl, Java, HTML, XML, or another appropriate server-side structured language in this example. It should be understood that the web server 906 and application server 908 are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store 910 may include mechanisms for storing production data 912 and user information 916, which can be used to serve content for the production side. The data store 910 also is shown to include a mechanism for storing log data 914, which can be used for reporting, analysis or other purposes. It should be understood that there can be many other aspects that may need to be stored in the data store 910, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 908. In one example, a user, through a device operated by the user, might submit a search request for a certain type of item. In this case, the data store 910 might access the user information 916 to verify the identity of the user and can access the catalog detail information to obtain information about items of that type. The information then can be returned to the user, such as in a results listing on a web page that the user is able to view via a browser on the electronic client device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 904 can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 904. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:

under the control of one or more computer systems configured with executable instructions, in response to receiving, from a thread of a block of threads, a first call to read a first block of data from an input file of a file system that is accessible to a virtual machine hosted by a host computing system, each thread of the block of threads executing a set of operations in a graphics processing unit in parallel with threads of the block of threads, the first call indicating a file descriptor allocated to the input file:

computing, based at least in part on a concurrent use counter, an input file offset;

determining that the first block of data is not currently resident in a least recently used cache of a file buffer, the least recently used cache being included in first system memory of the host computing system;

allocating a read page at a first system memory address of the host computing system to the least recently used cache of the file buffer; and providing the first block of data to the thread by causing the first block of data from the file associated with the indicated file descriptor to be copied, starting at a location in the input file corresponding to the input file offset, into a first virtual memory address mapped by an input/output memory management unit to the first system memory address of the read page; and in response to receiving, from the thread, a second call to write a second block of data to an output file of the file system that is accessible to the virtual machine:

determining an output file offset;

allocating a write page in a ring buffer of the file buffer for the second block of data in a second system memory address of the host computing system, the ring buffer being included in second system memory of the host computing system that is mapped to a second virtual memory of the virtual machine by an input/output memory management unit;

writing the second block of data to the write page at the second system memory address that corresponds to a second virtual memory address of the second virtual memory mapped by the input/output memory management unit; and causing the second block of data to be copied from the write page to the output file at a location in the output file that corresponds to the output file offset by placing a message in a message queue that indicates the second virtual memory address and the output file offset.

2. The computer-implemented method of claim 1, wherein the message is a first message and the method further comprises:

in response to receiving from the thread, prior to receiving the first call, a third call to open the input file:

determining that the thread is the first, of the block of threads, to call to open the input file;

allocating the file descriptor for the input file; and adding the allocated file descriptor to an index of active file descriptors in the file buffer.

3. The computer-implemented method of claim 1, further comprising:

in response to receiving, from the thread, a third call to close the input file:

decrementing a concurrent use counter;

determining, based at least in part on the decremented concurrent use counter, that the thread is a last thread of the block of threads to call to close the input file; and removing the file descriptor from an index of active file descriptors in the file buffer.

4. The computer-implemented method of claim 1, wherein causing the second block of data to be copied from the write page to the output file further includes:

accumulating a plurality of blocks of data in the ring buffer of the file buffer;

determining, based at least in part on a cumulative size of the plurality of blocks written to the ring buffer, to flush the plurality of blocks of data; and based at least in part on the determination, flushing the plurality of blocks of data to the output file in a single write operation.

5. A system, comprising:

one or more first processors;

one or more second processors configured to perform a set of operations in parallel and lockstep; and system memory including instructions that, when executed by the one or more first processors, cause the system to:

receive a call, from a thread of a plurality of threads being executed by the one or more second processors, to write a block of data to a file system, the plurality of threads executing a set of operations in parallel in the one or more second processors, the set of operations associated with an application executing on a virtual machine;

configure a buffer to receive the block of data in the system memory of the system, the buffer further configured to be accessible by the virtual machine;

write the block of data to the configured buffer; and cause the block of data to be copied from the configured buffer to the file system of the virtual machine.

6. The system of claim 5, wherein the buffer is configured to be accessible by the virtual machine by utilizing a hardware component configured to translate system memory addresses to virtual memory addresses.

7. The system of claim 5, wherein the buffer is configured to be accessible by the virtual machine by mapping the buffer to portions of virtual memory of the virtual machine using a hypervisor.

8. The system of claim 5, wherein the instructions that cause the system to be accessible by the virtual machine further include instructions that cause the system to copy the block of data from the buffer to virtual memory of the virtual machine using a hypervisor.

9. The system of claim 5, wherein the instructions that cause the system to determine a location in an output file of the file system into which copy the block of data based at least in part on one or more of a global file offset for the file, a local offset for the thread, or an offset specified by the call.

10. The system of claim 5, wherein the configured buffer is a ring buffer and the instructions that cause the system to cause the block of data to be copied, further include instructions that cause the one or more first processors to periodically examine contents of the ring buffer for data that needs to be copied to the file system.

11. The system of claim 5, wherein the one or more second processors are one or more graphics processing units, each of the plurality of threads is being executed by an execution core of one of the one or more graphics processing units.

12. The system of claim 5, wherein the instructions that cause the block of data to be copied further include instructions that cause the system to:

accumulate one or more blocks of data in the configured buffer;

determine to flush the one or more blocks from the configured buffer to the file system; and cause the one or more blocks to be copied from the configured buffer to the file system.

13. The system of claim 12, wherein the instructions that cause the system to cause the one or more blocks to be copied, further include instructions that cause the system to place, in a message queue, a message that indicates to the one or more processors to copy the one or more blocks of data from the memory at a memory address allocated to the configured buffer.

14. A non-transitory computer-readable storage medium having stored thereon executable instructions that, when executed by a first set of processors of a computer system that includes the first set of processors and a second set of processors different from the first set of processors, cause the computer system to at least:

receive a first call, from a thread of a plurality of threads being executed by the second set of processors, to read a block of data from a file of a file system of a virtual machine;

obtain a file descriptor for the file;

compute a file offset for the block of data;

based at least in part on a determination that the block of data is not in a buffer configured to be accessible by both the virtual machine and the plurality of threads:

allocate a memory address of the computer system to the buffer for receiving the block of data from the file; and provide the block of data to the thread by causing the block of data to be copied from the file associated with the file descriptor into the memory address of the buffer configured to be accessible by both the virtual machine and the plurality of threads.

15. The non-transitory computer-readable storage medium of claim 14, wherein the instructions that compute the file offset include instructions that, when executed by the first set of processors, cause the computer system to compute the file offset based at least in part on one or more of a global file offset, an identifier for the thread, or a block size of the block of data.

16. The non-transitory computer-readable storage medium of claim 14, wherein the instructions further include instructions that cause the computer system to:

receive a second call, from the thread, requesting to open the file;

determine that the thread is the first, of the plurality of threads, to request to open the file;

allocate the file descriptor for the file; and add the file descriptor to an index of active file descriptors.

17. The non-transitory computer-readable storage medium of claim 14, wherein the instructions further include instructions that cause the computer system to:

receive a second call, from the thread, requesting to close the file;

determine that the thread is the last thread of the plurality of threads to request to close the file; and remove the file descriptor of the file from an index of active file descriptors.

18. The non-transitory computer-readable storage medium of claim 14, wherein the instructions that cause the computer system to, as a result of the determination that the block of data is not in a buffer, place, in a message queue, a message that indicates to the first set of processors to copy the block of data to memory at the memory address.

19. The non-transitory computer-readable storage medium of claim 14, wherein:

the instructions further include instructions that cause the computer system to compute one or more file offsets based at least in part on a number of threads in the plurality of threads and a size of the block of data; and the instructions that cause the block of data to be copied cause the block of data to be copied from a location in the file based at least in part on the one or more computed file offsets.

20. The non-transitory computer-readable storage medium of claim 14, wherein the second set of processors comprises one or more graphics processing units.

* * * * *